Oct. 27, 1953 J. W. BALDE ET AL 2,657,307

POSITIVE FEEDBACK PULSE GENERATOR

Original Filed Oct. 6, 1948 6 Sheets-Sheet 1

INVENTORS
John W. Balde
Joseph C. Bregar
Kenneth L. Chapman,
BY
C. B. Hamilton
ATTORNEY INVENTORS
John W. Balde
Joseph C. Bregar
BY Kenneth L. Chapman,
C. B. Hamilton, ATTORNEY

POSITIVE FEEDBACK PULSE GENERATOR

Original Filed Oct. 6, 1948 6 Sheets-Sheet 3

INVENTORS
John W. Balde
Joseph C. Bregar
Kenneth L. Chapman,
BY
C. B. Hamilton
ATTORNEY

POSITIVE FEEDBACK PULSE GENERATOR

INVENTORS

John W. Balde
Joseph C. Bregar
Kenneth L. Chapman,

BY C. B. Hamilton

ATTORNEY

INVENTORS
John W. Balde
Joseph C. Bregar
BY Kenneth L. Chapman,
C. B. Hamilton ATTORNEY INVENTORS
John W. Balde
Joseph C. Bregar
BY Kenneth L. Chapman,
C. B. Hamilton ATTORNEY Patented Oct. 27, 1953

2,657,307

UNITED STATES PATENT OFFICE 2,657,307

POSITIVE FEEDBACK PULSE GENERATOR

John W. Balde, Morristown, N. J., and Joseph C. Bregar and Kenneth L. Chapman, Winston-Salem, N. C., assignors to Western Electric Company, Incorporated, New York, N. Y., a corporation of New York Original application October 6, 1948, Serial No. 53,076, now Patent No. 2,626,980, dated January 27, 1953. Divided and this application July 1, 1950, Serial No. 171,732

8 Claims. (Cl. 250—27)

This invention relates to a marking pulse generator and more particularly to a positive feedback pulse generator wherein a plurality of crystals with different resonant frequencies provide input voltage pips to a plurality of demodulating and amplifying tubes which clip and mix the resulting amplified signals to form a composite marking pulse having separate traces representative of each of the different resonant frequencies.

This application is a division of a copending application, Serial No. 53,076, filed October 6, 1948, now Patent No. 2,626,980, dated January 27, 1953, wherein a control system for testing the frequency response of tuned devices is described and claimed.

In the past, curve tracers have been utilized to present frequency response wave forms so that a device under test may be tuned to maximum response. This was accomplished by coordinating the horizontal sweep of an oscilloscope with the changes in frequency applied to the device under test in such a manner that the resulting voltage wave form appeared as a plot of the output frequency response on the vertical axis against frequency on the horizontal axis. However, this method yields only qualitative results. A later method applied two standard frequency response curves to the screen of an oscilloscope for use as go, no-go limits for a third frequency response curve which was derived from a device to be tested. However, this method required such a large number of standard resonant devices that it was not suitable for production line usage.

Accordingly, it is one of the objects of this invention to provide an electronic curve tracer with indicia of frequency which is synchronized with the frequency variations applied to a device under test so that accurate quantitative measurements can be quickly made upon electrical devices and which is also suitable for production line usage.

With this and other objects in view, the invention comprises a curve tracer for testing the resonant qualities of an electrical device wherein a frequency modulator applies a frequency modulated voltage to a device to be tested for generating a frequency response voltage which is to be compared on the screen of a cathode ray tube with a plurality of constant bandwidth frequency markers produced by a plurality of crystal controlled positive feedback pulse generators which are energized by the frequency modulated voltage. The curve tracer also includes a plurality of attenuators responsive to a variation in the input voltage of the device under test for applying a plurality of definite decibel (db) level attenuation limits to the screen of the cathode ray tube.

Figure 1:
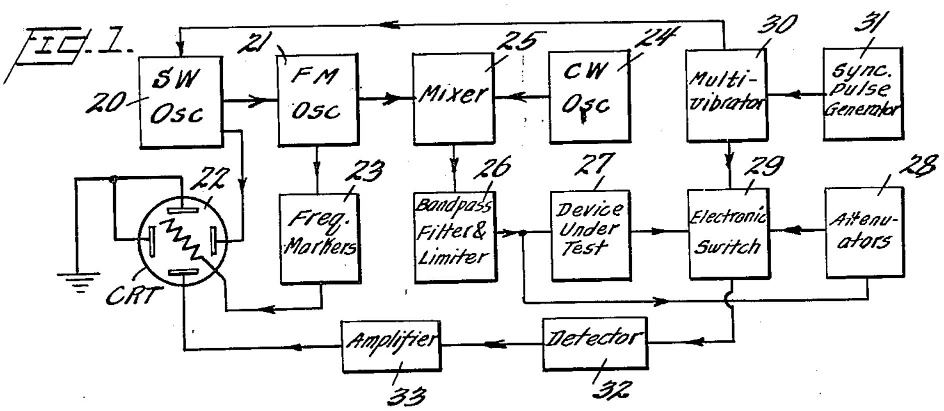
Figures 2A, 2B, 2C, 2D, 2E, 2F, 2G, 2H, 3A, 3B:
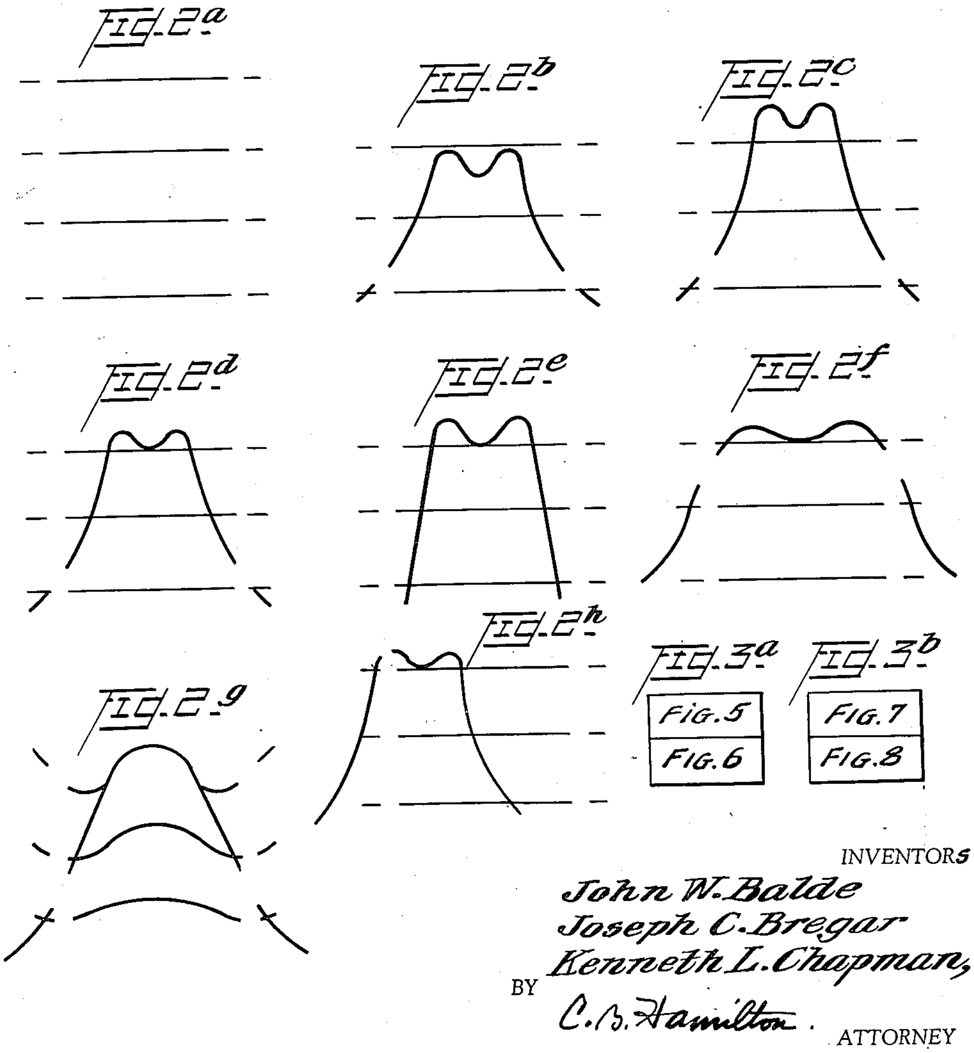
Figure 4A:
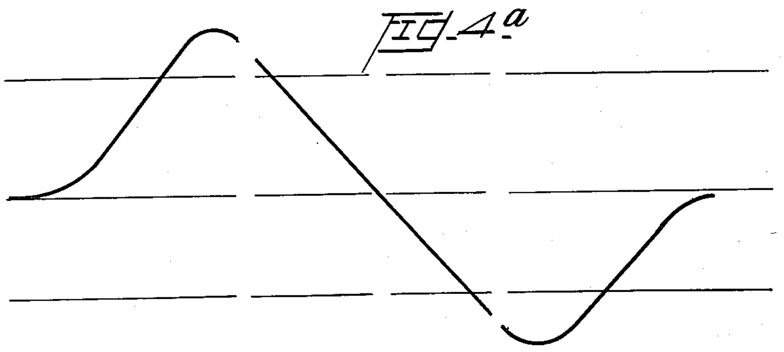
Figure 4B:
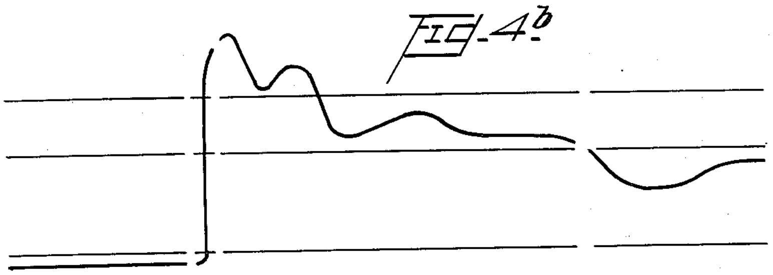
Figure 4C:
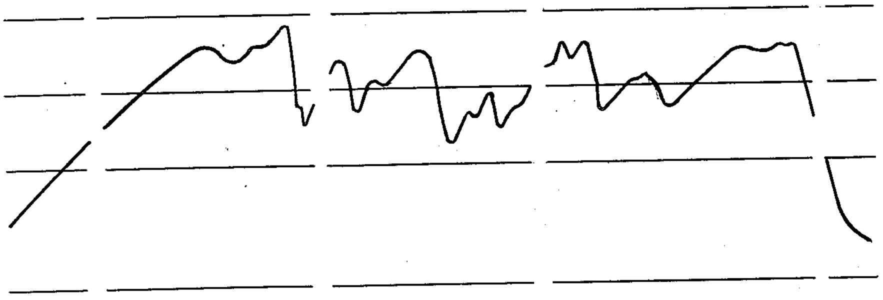

Other objects and advantages of this invention will more fully appear from the following detailed description, taken in conjunction with the accompanying drawings, in which:

Fig. 1 is a schematic block diagram of the circuit embodying the present invention;

Figs. 2*a*–2*h* comprise a plurality of curve tracer wave forms showing various stages of filter tuning obtained when a filter is tested in the apparatus of this invention;

Figs. 3*a*–3*b* show the manner in which subsequent Figures 5 to 8 of the drawings are positioned adjacent each other to show a specific embodiment of the invention;

Figs. 4*a*-4*c* show curve tracer wave forms of the frequency response of a plurality of devices tested in the present system to illustrate the flexibility thereof; and Figs. 5 to 8, when arranged as shown in Figs. 3*a*–3*b*, show in detail circuit arrangements of certain elements of a typical system incorporating the present invention.

Referring now to Fig. 1, a saw-tooth wave oscillator 20 is provided for modulating the output from a frequency modulation oscillator 21 so as to produce a frequency modulated signal. The frequency of saw-tooth wave oscillator 20 is controlled by a synchronizing signal from multivibrator 30, thereby causing oscillator 20 and multivibrator 30 to operate at the same frequency. Multivibrator 30 frequency is held at a multiple of the 60 cycles per second power line frequency by means of a synchronizing pulse generator 31. The saw-tooth modulating signal is adjusted to provide a frequency modulated signal with a band sweep of any desired frequency width such as 75 kc. In addition, the saw-tooth wave oscillator 20 also provides a sweep voltage which is applied to the horizontal deflection means of a cathode ray tube 22.

The output from the frequency modulation oscillator 21 is applied to a circuit 23 whose function is to utilize the frequency modulated signal to generate a pair of frequency bandwidth markers which are a certain adjustable bandwidth apart. The markers thus generated are applied to the intensity modulation means of the cathode ray tube 22. As the frequency marker circuit is energized by the frequency modulated signal, the drift in the oscillator 21 is of no consequence since the drift in the oscillator 21 produces a change in output frequency and scale frequencies alike so that the scale produced by the markers remains unchanged in absolute frequency bandwidth.

A continuous wave oscillator 24 of an adjustable constant frequency output is connected to a mixer tube 25 to provide a heterodyning frequency signal which is mixed with the frequency modulated signal from the oscillator 21 to provide an output frequency modulated voltage with an adjustable mean frequency. By temperature compensating the oscillator 24, it is possible to derive a test voltage from the mixer tube 25 which has a frequency bandwidth of a constant mean frequency. Thus by varying the output frequency of the oscillator 24, it is possible to vary the frequency range over which the test device frequency characteristic is obtained.

The frequency modulated signal of the desired mean frequency is applied to a circuit 26 comprising a band pass filter and a limiter circuit which serve to remove the extraneous frequency voltages and to provide a frequency modulated voltage of constant amplitude. It is essential that the test voltage be of constant amplitude in order that the visual indication of the frequency characteristic of a device 27 to be tested is presented in an undistorted form which is suitable for measurement by a direct reading on the cathode ray tube screen.

This constant amplitude voltage is applied to the test device 27 in order to generate a frequency response voltage which is proportional to the frequency characteristic of the device 27 to be tested. A plurality of attenuators 28 is also connected to the same source of voltage as that which is applied to the device 27 so as to produce a plurality of attenuation voltages which are at definite db levels with respect to the input voltage applied to the device 27. This method of energizing the attenuation means assures an accurate Thevenin voltage measurement on the screen of the cathode ray tube 22 inasmuch as any change in the input voltage of the device 27 causes a corresponding change in the level of the attenuation lines. When the internal impedance of the voltage source is of the same magnitude as the input impedance of the device 27, the variation of input impedance caused by the varying applied test frequencies produces a corresponding change in the input voltage and subsequently in the attenuation lines. However, when the input impedance of the device 27 is larger than the internal impedance of the voltage source, the variation of input impedance does not affect the input voltage and the attenuation lines remain unchanged.

An electronic switch 29, which is triggered by a multivibrator 30 is connected to the test device 27 and to the attenuators 28 so that the frequency response voltage and the attenuator voltages are passed in sequence through detector 32 which eliminates the high frequency components. The demodulated frequency response voltages are amplified by amplifier 33 and then impressed in sequence on the vertical deflection means of the cathode ray tube 22. The multivibrator 30 is adjusted to trigger the switch 29 so that one complete frequency response or attenuation voltage wave form is applied to the vertical deflection means for each complete horizontal sweep of the electron beam. In this manner, the speed of the sweeping voltage and the persistence of the screen of the cathode ray tube 22 coact to present a single picture of the frequency characteristic curve of the device 27 to be tested superimposed upon the traces of the attenuation lines and the frequency markers. The simultaneous comparison of the frequency characteristic curve with the frequency and attenuation limits allows rapid adjustment and alignment of such test articles as filters and radio frequency receivers during the period in which the test is being performed.

Figure 5:
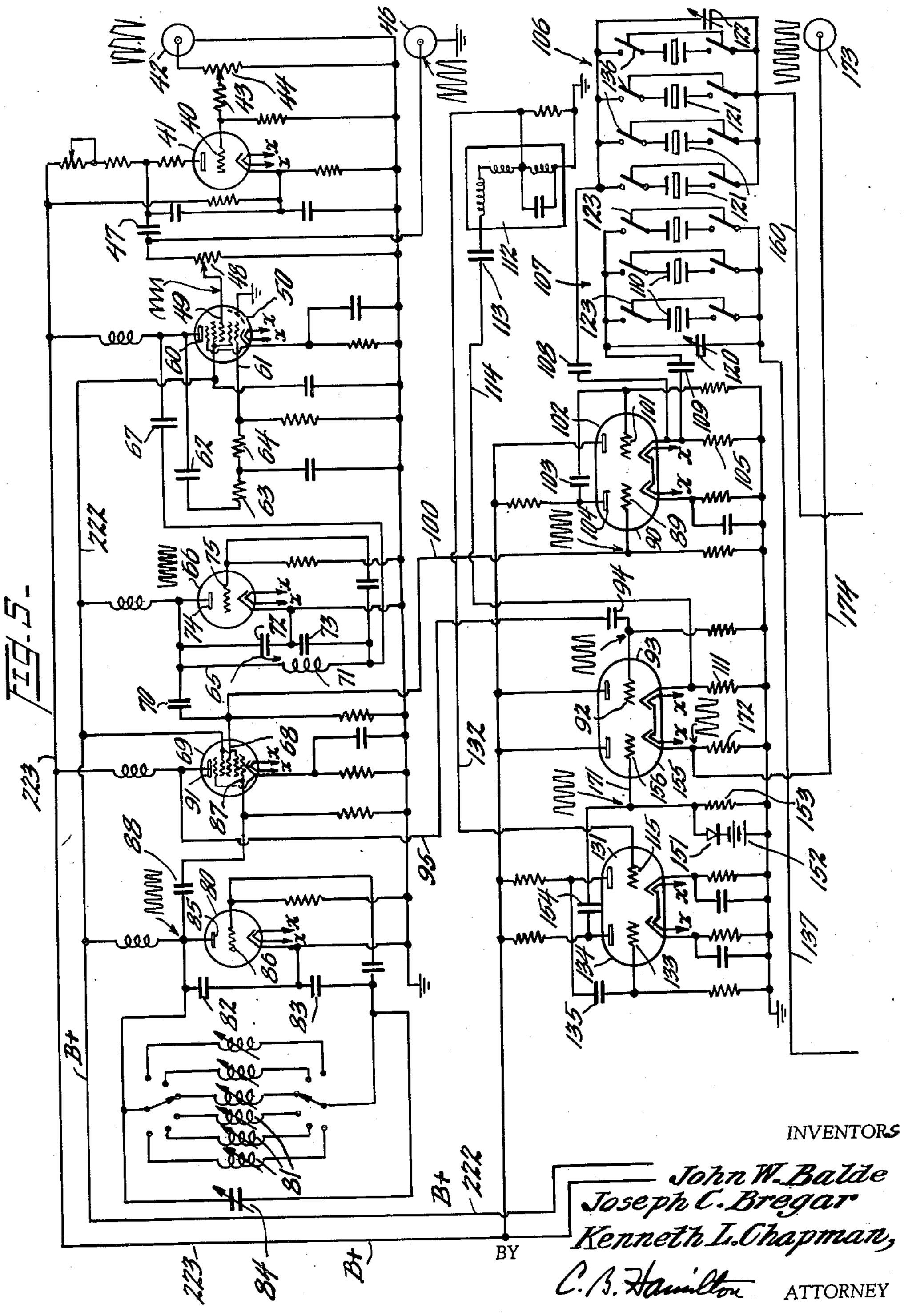

In Fig. 5, a saw-tooth oscillator tube 41 is shown having a grid 40 connected to an input jack 42 through a resistor 43 and a variable resistor 44; thus a synchronizing voltage may be applied to the grid 40 to control the frequency of oscillation of the tube 41. A condenser 45, connected across the tube 41, is charged by the voltage from a B+ supply during the period which the tube 41 is not conducting. When a positive pulse of voltage is placed on the grid 40 from the input jack 42, the tube 41 conducts, thus allowing the condenser 45 to discharge quickly. The charging and the discharging of the condenser 45 produces a voltage of a substantially saw-tooth wave form which is applied to an output jack 46 through a condenser 47. This saw-tooth wave is applied from the jack 46 to the horizontal deflection means of the cathode ray tube 22 to provide a linear sweeping voltage.

This saw-tooth voltage is also applied to a control grid 49 of a reactance tube 50 through the condenser 47 and a variable resistor 48. A plate 60 of the tube 50 is connected to a control grid 61 through a condenser 62, a resistor 63 and a resistor 64. A phase shifting network comprising the condenser 62 and the resistors 63 and 64 serves to place a voltage on the control grid 61 which is 90° out of phase with the voltage on the plate 60 of the tube 50. Since the plate 60 is supplied with voltage from a tuned circuit 65 of a Colpitts oscillator tube 66 through a condenser 67, the voltage of the control grid 61 is 90° out of phase with the voltage existing across the tuned circuit 65. The tuned circuit 65 includes an inductance coil 71 and a pair of condensers 72 and 73 which are shunted in parallel between a plate 74 and a control grid 75 of the tube 66. Because of the 90° phase shift in the voltage on the control grid 61, the current flowing through the tube 50 is 90° out of phase with the voltage existing across the tuned circuit 65 so that the tube 50 acts as a reactance in its effect on the tuned circuit 65. The reactance effect of the tube 50 causes a variation in the frequency of oscillation of the tube 66 by an amount which is proportional to the instantaneous direct current value of the saw-tooth wave impressed on the control grid 49 of the tube 50. The impressed saw-tooth modulating voltage on the grid 49 varies the plate current of the tube 50 with the result that the actual magnitude of the reactance effect of the tube 50 is varied in accordance with the plate current of tube 50, thus causing a variation in the oscillator tube frequency output from the tuned circuit 65 due to the resulting change in the LC ratio of the oscillator tank circuit 65. This variation in the reactance effect of the tube 50 determines the maximum frequency band sweep of the frequency modulated voltage of the oscillator tube 66. The frequency modulated voltage from the tuned circuit 65 is then applied to a control grid 68 of a mixer tube 69 by means of a condenser 70.

A continuous wave oscillator tube 80 is adjusted to a certain frequency of oscillation by the selection of the proper size of the adjustable circuit elements which comprise the tuned tank circuit of the Colpitts oscillator tube 80. This tuned circuit includes a plurality of adjustable inductance coils 81, a pair of temperature compensated condensers 82 and 83, and a variable condenser 84 which are all shunted in parallel between a plate 85 and a control grid 86 of the tube 80. The frequency of oscillation of the tube 80 is adjusted by the choice of the inductance coils 81 while the temperature compensated condensers 82 and 83 serve to prevent any frequency drift of the oscillator tube 80 due to temperature changes. The constant frequency output from the tube 80 is coupled to a control grid 87 of the mixer tube 69 by a condenser 88.

The frequency modulated voltage applied to the grid 68 is heterodyned in tube 69 by the constant frequency voltage applied to the grid 87 so as to provide a carrier frequency of one desired value which is frequency modulated over a periodically varying preassigned range. The mean frequency of the voltage obtained from the tube 69 may be converted to any desired different mean frequency by a change in the value of the inductance coil 81, which change varies the frequency of the heterodyning voltage from the tube 80. This method of changing the mean frequency of the frequency modulated wave prevents any change in the bandwidth of the frequency modulated wave.

The frequency modulated voltage from a plate 91 of the tube 69 is applied to a control grid 92 of a cathode follower tube 93 through a condenser 94 and a conductor 95. The voltage applied to the grid 92 varies the current passing through the tube 93 so that a voltage is produced on a cathode resistor 111 in accordance with the variation of the plate current in the tube 93. The cathode follower tube 93 provides a means of matching a relatively low impedance band pass filter 112, connected to the resistor 111 by a coupling condenser 113 and a conductor 114, to the relatively high impedance voltage source. The band pass filter 112 removes any undesired high frequency voltages which may be present in the circuit from the oscillator tubes 66 and 80.

The filtered output from the filter 112 is impressed on a grid 115 of a triode amplifier tube 131 through a conductor 132. The amplified frequency modulated voltage from the tube 131 is coupled to a grid 133 of a triode amplifier tube 134 through a coupling condenser 135. The amplified voltage from the tube 134 is applied through a coupling condenser 154 to a grid voltage limiter circuit comprising a rectifier 151 and a battery 152 which are connected in parallel with a resistor 153. When the voltage output from the tube 134 exceeds the value of the voltage of the battery 152, the rectifier 151 applies the excessive voltage amplitude to ground so that no voltage pulses over a certain predetermined amplitude are applied to a grid 156 of a cathode follower tube 155 through a conductor 171. As a result of the action of the limiter circuit, the peak of the voltage wave applied to the control grid 156 is clipped off in a manner as illustrated by the wave form shown on the drawing in conjunction with the grid lead 171. By limiting the amplitude of the voltage applied to the grid 156, the frequency modulated voltage output of the tube 155 is limited to a constant amplitude.

The variation in the voltage applied to the grid 156 varies the plate current passing through a cathode resistor 172 and the tube 155 so as to produce a varying voltage on the high potential end of the resistor 172. The constant amplitude frequency modulated voltage from the resistor 172 is connected to an output jack 173 through a conductor 174.

The frequency modulated voltage generated by the oscillator tube 66 is also applied to a control grid 89 of a triode amplifier tube 90 through a conductor 100. The frequency modulated voltage is amplified in the tube 90 and then coupled to a grid 101 of a cathode follower tube 102 through a coupling condenser 103 which is connected to a plate 104 of the amplifier tube 90. The voltage applied to the grid 101 varies the plate current flowing through the tube 102 so that a varying voltage is produced at the high potential end of a cathode resistor 105.

The varying voltage produced by the resistor 105 is coupled to a pair of crystal filter circuits 106 and 107 through a pair of coupling condensers 108 and 109. The crystal filter 107 comprises a plurality of crystals 110 and a variable condenser 120 which are connected in parallel. The crystal filter 106 comprises a plurality of crystals 121 and a variable condenser 122 which are connected in parallel. The frequency modulated signal is applied to the filter circuit 107 through the coupling condenser 109 to produce a voltage pip at a point in the frequency spectrum which is determined by the series resonant frequency of the crystal 110. The variable condensers 120 and 122 neutralize the capacitance of the crystals 110 and 121, respectively, so as to suppress spurious responses of the crystal filters 106 and 107. The frequency at which the voltage pip is generated may be varied by changing a switching means 123 so that a crystal 110 which is cut to resonate at a different frequency may be placed in the filter circuit 107. The crystal filter 106, including a switching means 136, functions in the same manner as the circuit 107 and consequently is not explained in detail. The difference in frequency at which circuits 106 and 107 generate their frequency disturbance is the bandwidth which is intercepted between the frequency markers on the screen of the cathode ray tube 22. For convenience, the crystal filter circuit 107 is assumed to generate a disturbance at a lower frequency than the crystal filter circuit 106 although such an assumption is not essential to the operation of the marker system.

Figure 6:
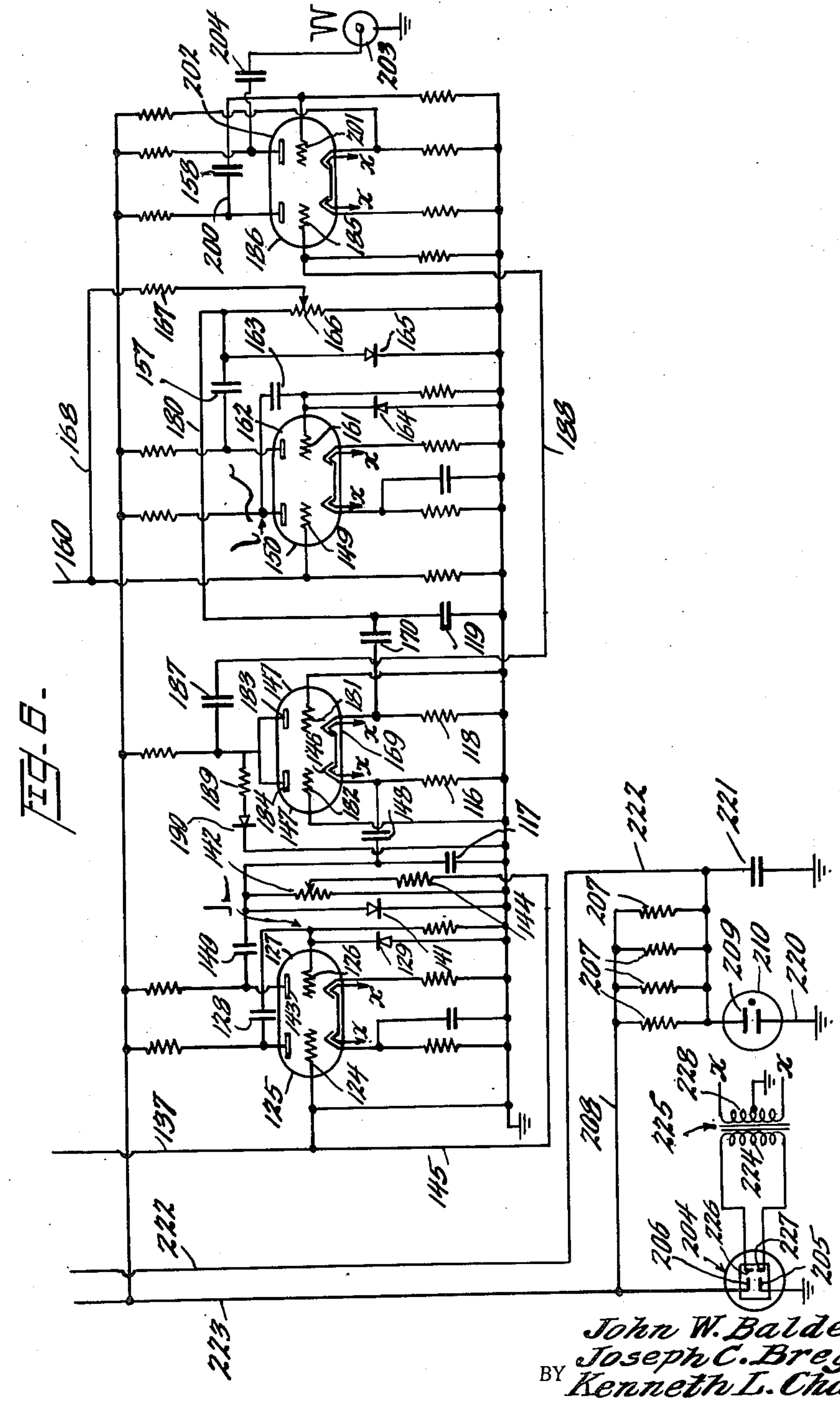

Referring now to Fig. 6, a conductor 137 is connected to the crystal filter circuit 107 and to a control grid 124 of a triode amplifier tube 125. The voltage disturbance produced by the crystal is amplified by the tube 125 and then impressed on a grid 126 of a clipper amplifier tube 127 through a coupling condenser 128. A rectifier 129, which is connected from the grid 126 of the tube 127 to ground provides detection of the high frequency component of the applied voltage and, therefore, serves to accentuate the variation in the envelope of the applied voltage wave form.

The voltage output from the tube 127 is coupled by a coupling condenser 140 to a clipper positive feedback circuit comprising a rectifier 141 and a variable resistor 142 which are connected in parallel between a plate 143 of the tube 127 and ground. The rectifier 141 serves to conduct any positive pulses to ground so that an entirely negative intensity marker pip is produced by the amplification of the frequency disturbance from the circuit 107. The voltage thus limited by the rectifier 141 is applied across the feedback resistor 142. An adjustable amount of the voltage developed across the resistor 142 is applied to the grid 124 of the first amplifier tube 125 through a resistor 144 and a conductor 145. This feedback voltage reinforces the envelope variation of the frequency disturbance originally impressed on the grid 124 from the circuit 107 so that the combination of the tubes 125 and 127 with their associated circuits acts essentially as a wave shaper or pulse generator which generates a clearly defined marking pip from the frequency disturbance produced by the crystal filter circuit 107. The marking pip produced by the tubes 125 and 127 is impressed on a cathode 146 of a mixer tube 147 through a coupling condenser 148. A cathode load and bias resistor 116 connects the cathode 146 to ground and by-pass condenser 117 connecting one terminal of the condenser 148 to ground conducts any undesired transient voltages to ground.

The higher frequency disturbance produced by the crystal filter circuit 106 is connected to a grid 149 of a triode amplifier tube 150 by means of a conductor 160. The voltage impressed on the grid 149 is amplified by the tube 150 and coupled to a grid 161 of a clipper amplifier tube 162 by means of a coupling condenser 163. Inasmuch as the tubes 150 and 162 together with their associated clipper circuits comprising a pair of rectifiers 164 and 165, and their associated feedback circuit including a variable resistor 166, a fixed resistor 167, a conductor 168, and a coupling condenser 157 function in the same manner as their identical counterparts explained in conjunction with the tubes 125 and 127, the operation of the present circuits are not explained in detail. The frequency marking pip generated by the combination of the tubes 150 and 162 is impressed on a cathode 169 of the mixer tube 147 through a coupling condenser 170 and a conductor 180. A cathode load and bias resistor 118 connects the cathode 169 to ground and a by-pass condenser 119 connecting one terminal of the condenser 170 to ground conducts any undesired transient voltages to ground.

Since grids 181 and 182 of the mixer tube 147 are connected to ground, the pulses applied to the cathodes 146 and 169 vary the plate to cathode voltage of the tube 147 so that plate current flows from the cathodes 146 and 169 to a pair of plates 183 and 184 in accordance with the positive pulses which are applied to the cathodes 146 and 169. As the plates 183 and 184 are connected together, a composite signal including both of the frequency marker pips is coupled to a grid 185 of an amplifier tube 186 through a coupling condenser 187 and a conductor 188. The spacing between the two frequency markers comprising the composite signal is determined by the difference in frequency at which the filter circuits 106 and 107 generate the original frequency disturbances. As stated before, the spacing may be varied to any desired bandwidth by switching different crystals 110 and 121 into the circuit. A resistor 189 and a rectifier 190 which are connected in series between the plates 183, 184 and ground serve to clip the unwanted positive portion of the amplified frequency marker pips.

The voltage applied to the grid 185 is amplified by the tube 186 and then coupled through a conductor 200 and a condenser 158 to a grid 201 of a clipper tube 202 which is biased so that only the large positive pulses of voltage of the frequency markers cause a change in the plate current flowing through the tube 202. By biasing the tube 202 to this point of operation, all of the low voltage base line disturbances are removed from the voltage output. This voltage is coupled to an output jack 203 through a coupling condenser 204. A typical marker wave form of negative intensity is illustrated on the drawing in conjunction with the output jack 203. The output voltage is in turn impressed upon the intensity modulation means of a cathode ray tube 22.

A power input plug 204 is provided with four terminals, one of which, a terminal 205, is connected to ground. A terminal 206 supplies a positive rectified voltage to a plurality of dropping resistors 207 through a conductor 208. The resistors 207 are connected in parallel between the conductor 208 and a plate 209 of a gaseous voltage regulator tube 210. The resistors reduce the voltage applied from the terminal 206 to a certain lower value, for instance 105 volts, and the regulator tube 210 maintains this voltage at a constant value by conducting excess voltage to ground through a conductor 220. A filter condenser 221 is connected in parallel with the tube 210 to by-pass any undesired high frequency voltage to ground. A conductor 222 applies the reduced voltage to the plurality of elements in the circuit while a conductor 223 applies the higher voltage B supply from the terminal 206 to the plurality of circuit elements. A primary winding 224 of a filament transformer 225 is connected between a pair of terminals 226 and 227 of the input jack 204. A secondary winding 228 of the transformer 225 has two output terminals $x$—$x$ which are connected in parallel with all the cathode heaters of the tubes in the circuit to provide a source of filament voltage.

Figure 7:
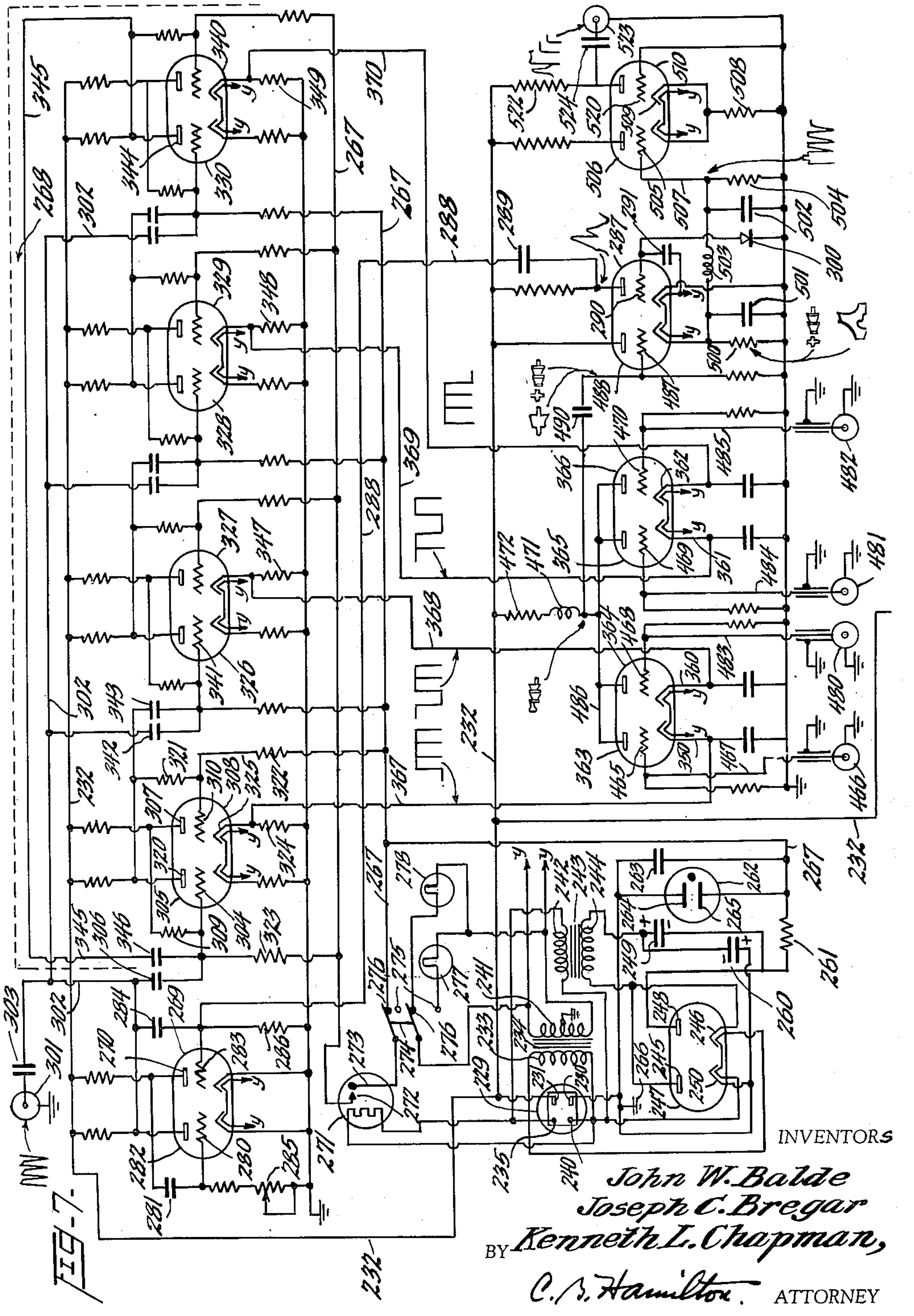
Figure 5:
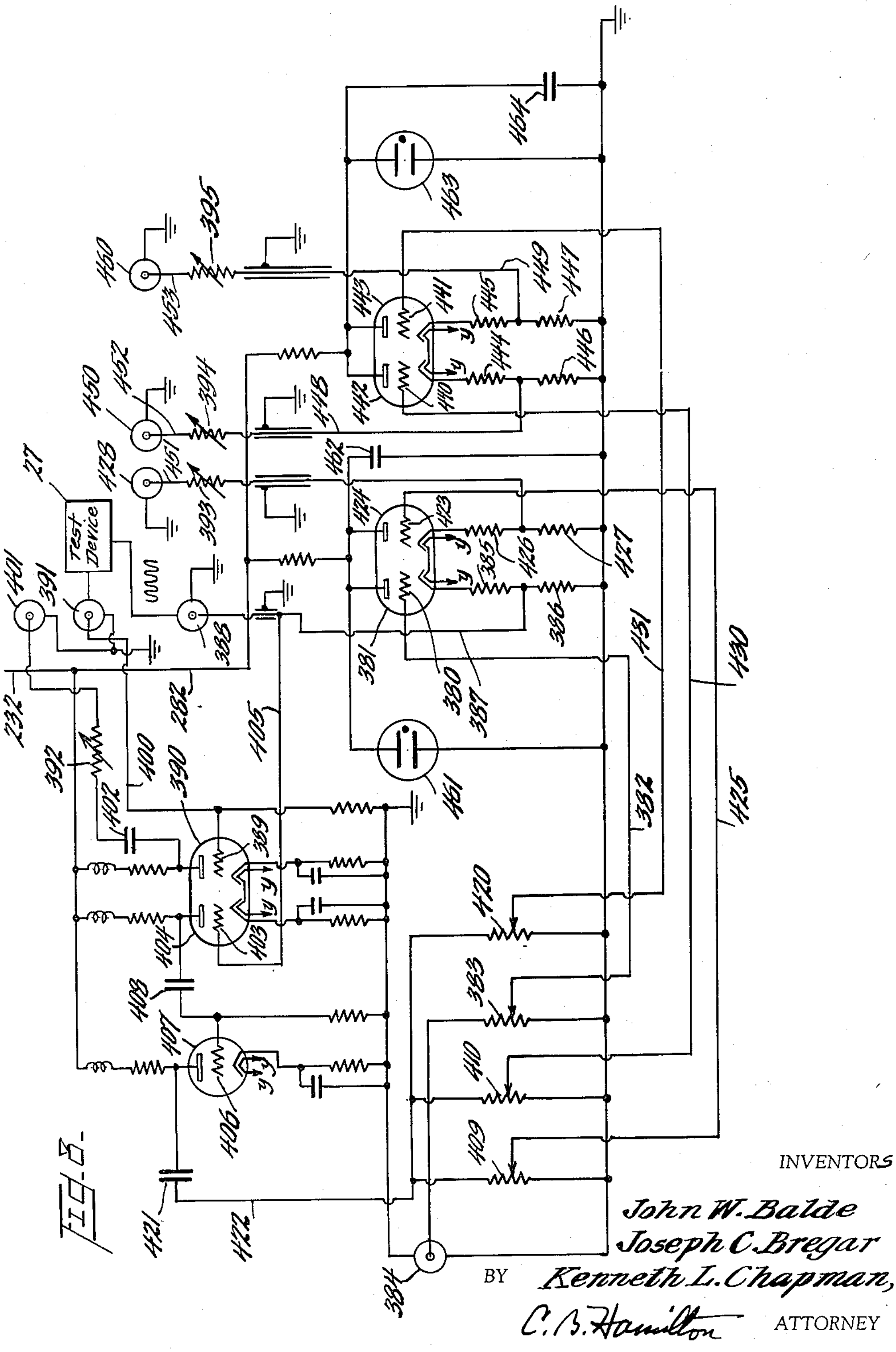

Referring now to Fig. 7, an input plug 229 is provided with a plurality of terminals, one of which, a terminal 230, is connected to ground. A terminal 231 is connected by a conductor 232 to a plurality of elements in the circuit for the purpose of supplying positive B voltage of approximately 300 volts in magnitude. A primary winding 233 of a filament transformer 234 is connected across a pair of terminals 235 and 240 which are energized by standard A. C. supply voltage. A secondary winding 241 of the transformer 234 terminates in a pair of leads $y$—$y$ which are connected in parallel with all of the designated cathode heaters of the tubes found in the circuit comprising Fig. 7 and Fig. 8. A primary winding 242 of a high voltage transformer 243 is connected across the terminals 235 and 240 of the input jack 229 to supply A. C. voltage to a secondary winding 244 of the transformer 243. One terminal of the winding 244 is connected to a plate 245 and a cathode 246 of a rectifier tube 247. The other terminal of the winding 244 is connected to a plate 248 through a condenser 249 and to a cathode 250 through a condenser 260. This manner of connection provides a standard voltage doubling rectifier circuit, the output of which is applied to a voltage regulator tube 262 through a dropping resistor 261. A filter condenser 263 is shunted between a plate 264 and a cathode 265 of the tube 262 so as to provide a by-pass for any stray alternating current components of voltage. Since the voltage of positive polarity applied to the plate 264 of the tube 262 is connected to ground by a conductor 266, the tube 262 provides a constant regulated voltage of negative polarity to a conductor 267. The conductor 267 supplies the negative bias voltage to a plurality of control grids in a ring counter system 268.

A time delay relay 271 including a contact 272 and a connection arm 273 is connected between the A. C. terminals 235, 240 of the input plug 229 to provide a means for retarding the application of the negative bias to the grids of the tubes in the ring counter system 268. The time delay allows the ring counter system 268 to adjust to proper initial operating condition before all tubes are biased into an operative condition. A manual switch 274 connecting two portions of the conductor 267 is provided for determining the number of paths of the ring counter system 268 which are to be energized. When the switch 274 is connected to a pair of contacts 275, the grid bias voltage is removed from all but one of the counter system stages so that only one path is conducting. When the switch 274 connects to a pair of normal operation contacts 276, all of the stages of the counter system are energized. A pair of lamps 277 and 278 which are connected in parallel with the secondary winding 241 give a visual indication of the position of the switch 274.

The ring counter system 268 is triggered from the output from a conventional asymmetrical multivibrator tube 269. A plate 279 of the tube 269 is connected to a grid 280 through a condenser 281. Another plate 282 of the tube 269 is connected to a grid 283 through a condenser 284. An adjustable grid resistor 285 is connected from the grid 280 to ground and another grid resistor 286 is connected from the grid 283 to ground. This conventional multivibrator arrangement produces a pulsating output voltage, the frequency of which is controlled by the RC time constant of the two resistor condenser combinations which include the resistor 285 and the condenser 281, and the resistor 286 and the condenser 284. In order to prevent any frequency drift, a synchronizing voltage is applied to the grid 283 of the tube 269 from a line frequency synchronizing tube 287 through a conductor 288 and a coupling condenser 289.

A grid 290 of the tube 287 is connected to one of the cathode heater connections $y$ through a condenser 291 and also to ground through a rectifier 300. The 60 cycle voltage from the cathode heater is rectified by the rectifier 300 so that only the positive pulses of the alternating current voltage are applied to the grid 290. This applied voltage causes the tube 287 to emit a larger plate current during the application of the positive 60 cycle pulse so that the voltage coupled to the grid 283 of the tube 269 through the conductor 288 consists of an irregular voltage wave of 60 cycle frequency. When the frequency of oscillation of the tube 269 is adjusted to some value of frequency which is a multiple or sub-multiple of the injected 60 cycle voltage, the voltage applied to the grid 283 serves to hold the multivibrator output frequency in synchronism with the control voltage which in this instance is the 60 cycle line voltage frequency. As disclosed hereinbefore, this synchronization prevents any 60 cycle motion on the screen of the cathode ray tube 22.

The output voltage from the multivibrator tube 269 is applied to an output jack 301 through a conductor 302 and a coupling condenser 303. From the jack 301 the voltage is supplied to the input jack 42 of Fig. 5 so that the saw-tooth wave oscillator 41 operates in synchronism with the switching rate of the tube 269.

The output voltage from the tube 269 is also applied to a grid 304 of a tube 305 through a coupling condenser 306. The grid 304 is connected to a plate 307 of a tube 308 through a fixed resistor 309. A grid 310 of the tube 308 is connected to a plate 320 of the tube 305 through a fixed resistor 321. The grids 304 and 310 are connected to the negative bias supply conductor 267 through the resistors 322 and 323. The hereinbefore described circuit including the tubes 305 and 308 is a conventional Eccles-Jordan flip-flop circuit with two stable conditions.

Assuming that the tube 305 is conducting and that the tube 308 is non-conducting, the application of a negative pulse from the multivibrator on the grid 304 of the tube 305 causes a reduction in the plate current which produces an increase in the voltage on the plate 320. The increased voltage as applied to the grid 310 of the tube 308 with the result that the tube 308 emits a plate current which produces a decreased voltage on the plate 307. The decreased voltage is applied to the grid 304 through the resistor 309 so that the bias on the grid 304 causes the tube 305 to become non-conducting. The emission of the plate current in the tube 308 also produces an increased voltage across a cathode resistor 324 which is connected between a cathode 325 and ground.

Inasmuch as a plurality of pairs of tubes, 326 and 327, 328 and 329, 330 and 340, are interconnected in the same conventional Eccles-Jordan flip-flop system as the tubes 305 and 308, the elements of the circuit are not described. In order to simplify the explanation of the operation of the ring counter system 268, it is also assumed that at the time when the tube 305 is conducting and the tube 308 is non-conducting, that the tubes 327, 329, and 340 are conducting and that the tubes 326, 328, and 330 are non-conducting.

When the tube 305 ceases to conduct as hereinbefore explained, a positive pulse is coupled to a grid 341 of the tube 326 through a coupling condenser 343. This positive pulse opposes the negative pulse from the multivibrator 269 which is applied to the grid 341 through a coupling condenser 342 and the conductor 302. The rise in voltage on the grid 341 causes a decrease in the plate current so that the tubes 326 and 327 function in the same manner as hereinbefore described in conjunction with the tubes 305 and 308. The remaining pairs of tubes 328 and 329, and 330 and 340 are also triggered in sequence and placed in operation in the same manner. The positive voltage pulse from a plate 344 of the tube 330 is conducted to the grid 304 of the tube 305 through a conductor 345 and a coupling condenser 346. In view of the hereinbefore described method of operation of the ring counter system 268, it is seen that the tubes 308, 327, 329, and 340 conduct in a predetermined sequence and that following conduction, the tubes cease conducting until triggered again by the preceding flip-flop circuit. This sequence of conduction produces a voltage wave form at each of a plurality of cathode resistors, 324, 347, 348, and 349, which is composed of one pulse of low voltage representing the period during which there is no current flow and three pulses of high voltage magnitude which represent the period during which the associated tube conducts. The four cathode voltage wave forms differ in the position of the low voltage pulse in accordance with the position of the tube in the conduction sequence. Four typical wave forms are shown in Fig. 6 in conjunction with the four cathode resistors 324, 347, 348, and 349.

The voltages derived from the cathode resistors 324, 347, 348, and 349 are applied to a plurality of cathodes 350, 360, 361 and 362 of a plurality of gate amplifier tubes 363, 364, 365, and 366 through a plurality of conductors 367, 368, 369, and 370. Inasmuch as the cathodes 359, 360, 361, 362 share the cathode resistors 324, 347, 348, 349 with the ring counter tube 308, 327, 329, 340, the biasing voltage applied to said cathodes will be the same voltage as that which is developed across the cathode resistors 324, 347, 348 and 349. Therefore, the low voltage pulses disclosed previously as existing during the period when the tubes 308, 327, 329, 340 are non-conducting are produced by the normal flow of plate current through the tubes 363, 364, 365, 366 and their associated cathode resistors 324, 347, 348, 349. When the high voltage pulses are applied to the cathodes 350, 360, 361, 362, the tubes 363, 364, 365, 366 do not conduct as the plate to cathode voltage is too small. The application of the low voltage pulse to the cathode increases the plate to cathode voltage so that the tube conducts. Therefore, the tubes 363, 364, 365, and 366 conduct only in the predetermined sequence in which the low voltage pulses are applied to the cathodes 359, 360, 361 and 362.

Referring now to Fig. 8, a grid 380 of a cathode follower tube 381 is connected through a conductor 382 and a variable resistor 383 to an input jack 384. The jack 384 is connected to the jack 173 of Fig. 5 so that the frequency modulated voltage from the tube 155 is impressed upon the grid 380 to vary the flow of plate current through the tube 381 and an associated pair of serially connected cathode resistors 385 and 386. The varying voltage impressed on the grid 380 varies the plate current flow so that a varying voltage is provided at the high potential end of the resistor 386. This varying voltage is applied to a device 27 to be tested through a conductor 387 which is preferably either shielded or a coaxial cable and an output jack 388. The cathode follower tube 381 serves to match the impedance of the voltage supply circuit to the low impedance of the device 27 to be tested. Through the impedance matching, it is possible to use long connecting lines to place the test device a great distance from the rack mounted electronic circuit without excessive pickup due to the long line. It also makes it possible to use the same equipment to test a wide range of devices of varying impedance through the expedient of changing the impedance match of the cathode follower tube 381.

The output frequency response voltage derived from the device 27 to be tested is applied to a grid 389 of a frequency compensated amplifier tube 390 through a conductor 400 and an input jack 391. The tube 390 amplifies the voltage impressed on the grid 389 without phase distortion so that a true wave form of the frequency response voltage will be presented on the screen of the cathode ray tube 22. The amplified response voltage is coupled to an output jack 401 through the coupling condenser 402 and an attenuator 392.

A grid 403 of a frequency compensated amplifier tube 404 is connected to the input of the device 27 through a conductor 405. The voltage impressed on the grid 403 is amplified and then applied to a grid 406 of a frequency compensated amplifier tube 407, through a coupling condenser 408. The amplified voltage from the tube 407 is connected to a plurality of adjustable resistors 409, 410 and 420 through a coupling condenser 421 and a conductor 422. The variable resistor 409 is connected to a grid 423 of a cathode follower tube 424 through a conductor 425. The resistor 409 is set to a certain value of desired attenuation and the resultant voltage developed across the resistor is coupled to the grid 423 so as to allow a certain amount of plate current to flow through the tube 424 and a pair of cathode resistors 426 and 527. The voltage variation from the high potential end of the resistor 427 is conducted to an attenuator 393 through a conductor 429. In a similar manner, the resistors 410 and 420, conductors 430 and 431, grids 440 and 441 of a pair of cathode follower tubes 442 and 443, cathode resistors 444, 445, 446, and 447, conductors 448 and 449 serve to provide a pair of voltages to a pair of attenuators 394 and 395. By varying the adjustable resistors 409, 410 and 420, it is possible to compensate for unequal losses in the tubes 424, 442 and 443 so that the same values of voltage will be coupled to the attenuators 393, 394, and 395. The output voltages from the attenuators 393, 394 and 395 are applied to a plurality of output jacks 428, 450 and 460 through a plurality of conductors 451, 452 and 453 which preferably are shielded conductors or coaxial cables. These output voltages are adjusted to the different attenuation levels desired on the screen of the cathode ray tube 22 by adjusting the attenuators 393, 394 and 395. A voltage regulator tube 461 and a condenser 462 are shunted across the tubes 381 and 424 to stabilize the voltage applied across said tubes. A similar voltage regulator tube 463 and a condenser 464 are also shunted across the tubes 442 and 443 in order to stabilize the voltage. The number of attenuation levels provided by the plurality of attenuators 393, 394 and 395 is not essential to the inventive principles of the circuit and a greater or lesser desired number of levels may be provided by varying the number of the resistors and their associated cathode follower circuits.

The hereinbefore described method for providing attenuation voltage allows Thevenin voltage measurements to be made on the screen of the cathode raye tube 22. Inasmuch as the attenuation resistors 393, 394 and 395 are energized from the input of the device 27 to be tested, the input impedance pull-down voltage is equalized by a corresponding variation in the plurality of attenuation voltages so that the attenuation lines move in accordance with the changing input voltage of the device 27 to be tested. If the attenuation lines are energized from a separate voltage source, the drop in the input voltage to the device 27 produced by the varying input impedance introduces an error in measurement when the decreased frequency response voltage is measured by comparison with the fixed attenuation lines. The effect of the varying input impedance of the device 27 may be seen in Fig. 2(*g*) wherein the three attenuation limit lines are distorted in accordance with the variation in the input voltage of the device 27 to be tested. In the remaining wave forms of Fig. 2, the attenuation lines remain linear and horizontal as the device 27 being tested is of such high impedance that the slight variation of the input impedance fails to produce any input voltage pulldown large enough to affect the attenuation reference lines.

This circuit also utilizes the varying input impedance as a means for tuning the device 27 to be tested. This feature is particularly useful when the output voltage from the device 27 does not reach a large enough magnitude to present a useful frequency response curve on the screen of the cathode ray tube 22. For instance, multistage filters require considerable preliminary tuning before any appreciable output voltage is obtained. Thus by using the input impedance pull-down voltage, it is possible to tune multi-stage filters by adjusting the wave forms of the attenuation lines to the required resonant peaks.

Referring again to Fig. 7, the frequency response voltage from the output jack 401 is supplied to a grid 465 of the gate tube 363 through an input jack 466 and a shielded or coaxial cable conductor 467. The attenuation level voltages from the output jacks 428, 450 and 460 are applied to a plurality of grids 468, 469 and 470 of the gate tubes 364, 365, 366 through a plurality of input jacks 480, 481, 482 and a plurality of shielded or coaxial cable conductors 483, 484 and 485. The plurality of gate tubes 363, 364, 365 and 366 conduct in the sequence that has previously been described in conjunction with the ring counter system 268 so that during the conduction period of each tube, the voltage impressed on the tube grids is amplified and applied to a conductor 486 which is connected to the B supply 232 through a choke coil 471 and a plate load resistor 472. The choke coil 471 provides shunt frequency compensation to prevent any distortion of the wave forms. Upon completion of one sequence of the tube conductions, a compositie signal comprising a frequency response voltage and three attenuation voltages is applied to a grid 487 of a detector tube 488 through a condenser 490. The condenser 490 is very small in capacitance so that the low frequency components of the voltage produced by the differences in the plate current of the four tubes will be removed.

The detector tube 488 is biased so that the plate current flows only in response to the positive portion of the applied voltage thus producing a partially detected voltage at the high potential end of a cathode resistor 500. The voltage is further detected by a filter circuit comprising condensers 501 and 502 and a choke coil 503. The voltage is finally detected by the choke coil 503 which removes the radio frequency component of the applied voltage. This detected voltage is applied across a grid bias resistor 504 and then to a grid 505 of an amplifier tube 506 through a conductor 507. The detected voltage varies the plate current flowing through a cathode resistor 508 which is connected in common with a cathode 509 of an amplifier tube 510. A grid 520 of the tube 510 is connected to ground through a conductor 521 so that the varying voltage developed across the resistor 508 by the varying plate current through the tube 506 serves to vary the plate current flowing through the tube 510. The voltage developed at the low potential end of a plate load resistor 522 is connected to an output jack 523 through a coupling condenser 524. The tubes 506 and 510 form a non-inverting amplifier arrangement whereby the detected wave form comprising the frequency response voltage and the attenuation voltages is amplified and applied to the output jack 523. From the output jack 523, the voltage is applied through an external connector to the vertical deflection means of the cathode ray tube 22.

From the foregoing detailed descriptions, it is believed that the operation of the circuit will now be understood.

As soon as the A. C. voltage is applied to the plug terminals 235 and 240, an alternating voltage is applied to the filament transformer 234 and thence to the grid 290 of the synchronizing tube 287. The pulse produced by this tube is coupled to the multivibrator 269 so that the pulse applied to the grid 40 of the saw-tooth oscillator tube 41 from the multivibrator 269 is in synchronism both with the 60 cycle line voltage and the switching rate of the multivibrator 269.

The pulse applied to the grid 40 determines the rate at which the tube 41 fires and, therefore, controls the saw-tooth voltage output from the oscillator 41. This saw-tooth voltage is applied to the horizontal deflection means of the cathode ray tube 22 through the output jack 46 to provide a linear sweeping voltage. The saw-tooth wave is also applied to the control grid 49 of the reactance tube 50 to control the flow of plate current therethrough. By varying the flow of the plate current in accordance with the impressed saw-tooth voltage, the reactance effect of the tube 50 on the tuned circuit of the oscillator tube 66 is also varied in accordance with the impressed saw-tooth wave form. The result of the varying reactance is to vary the frequency of oscillation of the oscillator tube 66 so that the output voltage from the tube 66 is frequency modulated in accordance with the original saw-tooth voltage.

The frequency modulated voltage from the tube 66 is applied to the control grid 68 of the mixer tube 69, the control grid 87 of which is connected to a continuous wave oscillator tube 80. The inductance coil 81 of the tuned circuit of the tube 80 is adjusted to the value which produces a constant frequency output from the tube 80, which, when heterodyned against the frequency modulated voltage from the tube 66, produces a frequency modulated voltage of the desired mean frequency. In this manner, the range of frequencies over which the device 27 is to be tested may be varied at will. The voltage output from the mixer tube 69 is filtered in the band pass filter 112 and is subsequently amplified and limited in the tubes 131, 134, and 155. This constant amplitude frequency modulated voltage is applied to the output jack 173.

The frequency modulated voltage from the tube 69 is also applied through a pair of amplifying tubes 90 and 102 to a plurality of crystal filters 106 and 107. The switching means 123 is then moved to select the crystal 110 which passes a voltage of a desired frequency. The switching means 136 is actuated to select the crystal 121 which passes a voltage of a second desired frequency. The difference in frequency at which the crystal filters 110 and 121 pass their respective voltage pulses is the absolute difference in frequency between the two negative intensity frequency bandwidth markers which are to appear on the screen of the cathode ray tube 22.

The slight voltage disturbances produced in the envelope of the frequency modulated signal applied to the crystals 110 and 121 are shaped into clear negative intensity pulses by the action of the two positive feedback circuits comprising the tubes 125, 127 and the tubes 159, 162. The two pulses from the pulse shapers are mixed together in the tube 147 to provide a composite signal including both frequency markers removed from each other by a distance representative of the difference in frequencies at which the crystals 110 and 121 pass their respective voltages. This voltage is clipped and amplified by the tubes 186, 202 and subsequently coupled to the output jack 203. These negative intensity marking pips are supplied from the jack 203 to the intensity modulating means of the cathode ray tube 22 through an external conductor.

The freqnency modulated voltage applied to the jack 173 is connected to the jack 384 through an external conductor (not shown). From the input jack 384 the voltage is applied through a variable resistor 383 and a cathode follower tube 381 to output jack 388. The device 27 which is to be tested is connected to the jack 388 through an external cable to receive the testing voltage and is also connected to the jack 391 through an external cable. The jack 391 applies the frequency response voltage from the device 27 through the conductor 400 to the amplifier tube 390. The amplified voltage from the tube 390 is applied to the output jack 401 through the attenuator 392.

A voltage is derived from the input of the device 27 in substantial accordance with the variation of the input impedance of the device 27 and applied through a pair of frequency compensated amplifiers 404, 407 to a plurality of variable resistors 409, 410, 420. These resistors are then adjusted to compensate for the unequal losses in the tubes 424, 442 and 443. From the resistors 409, 410, and 420, the voltage is applied to the attenuators 393, 394, and 395 through the impedance matching cathode follower tubes 424, 442 and 443 and then to the output jacks 428, 450 and 460. The attenuators 393, 394, 395 are set to provide the desired attenuation level lines which are to appear on the screen of the cathode ray tube 22.

A plurality of external connectors connect the output jacks 401, 428, 450, and 460 to the input jacks 466, 480, 481 and 482. From the input jacks, the voltage is applied to the grids of the gate tubes 363, 364, 365, 366 which are rendered conductive in a predetermined sequence by the ring counter system 268. The plurality of attenuation voltages and the frequency response voltage are mixed together by the gate tubes and the resultant composite signal is detected and amplified by the tubes 488, 506 and 510. The final voltage applied to the output jack 523 is a composite clear voltage wave form shown in conjunction with the output jack 523 in Fig. 6, and is applied to the vertical deflection means of the cathode ray tube 22 through external connection means.

Referring now to Fig. 2, (*a*) shows the plurality of traces formed on the screen of the cathode ray tube when the device 27 is not tuned. The upper three lines from bottom to top represent the maximum, minimum and zero reference attenuation levels, respectively. The lowermost of the traces is the untuned frequency response trace of the device 27 under test. The two dashes in each of the traces are due to the negative intensity frequency bandwidth markers which are applied to the intensity modulating means of the cathode ray tube 22. The segment of the trace intercepted between the two marker dashes represents the particular desired bandwidth. Inasmuch as the internal impedance of the device 27 is not of the same magnitude as the internal impedance of the voltage source, the input voltage pulldown is so small that the attenuation lines are not changed from the straight horizontal trace. Fig. 2(*g*) shows a set of attenuation lines which are modified in wave form by the input impedance variation.

The plurality of scales provided on the screen of the cathode ray tube 22 are used in making many different tests either singly or concurrently. In Fig. 2(*b*) the device 27 is correctly tuned in both the primary and the secondary windings so that the two-peaked response curve is centered in the desired frequency band as indicated by the frequency markers. When it is desired to check the gain characteristic of the device 27, an external amplifier may be provided at the output of the test device 27 so that the output may be raised or lowered through a certain predetermined range. If it is not possible to bring the mid-frequency response of the test curve to the zero reference line by varying the gain of the amplifier through the allowable range then the device 27 will be rejected. Fig. 2(*b*) shows a curve in which the gain characteristic of the device is too low because the mid-frequency valley is below the zero reference line. In a like manner, Fig. 2(*c*) shows a frequency response curve in which the gain characteristic is too high because the mid-band response may not be lowered to the zero reference line. Fig. 2(*d*) shows a typical wave form of a correctly tuned resonant device which has an acceptable gain characteristic.

It is also possible to test the width of the response curve by using the indicia on the screen of the cathode ray tube 22. Fig. 2(*e*) shows a frequency response curve in which the attenuation characteristic is too narrow because the attenuation of the device 27 is too large within the desired pass band indicated by the frequency markers. Fig. 2(*f*) shows a frequency response curve in which the attenuation characteristic of the device 27 is too wide inasmuch as the value of attenuation is below the minimum value of attenuation, shown by the reference line, for a range of frequencies larger than the desired frequency band indicated by the frequency markers.

Fig. 2(*g*) shows a properly tuned resonant device 27 wherein the input voltage pulldown is sufficient to change the wave forms of the attenuation lines as hereinbefore described. Fig. 2(*h*) shows a wave form from a device 27 which has a proper gain characteristic and an acceptable band width, however, the mid-frequency of the response curve is left of the center of the desired frequency band. By returning the device 27, it is possible to move the mid-frequency point to coincide with the center of the desired frequency band indicated by the frequency markers.

Figs. 4(*a–c*) show wave forms which are typical of various modifications and uses of the invention. Fig. 4(*a*) shows a wave form in which the curve tracer is used to present the frequency response curve of a frequency discriminator. Fig. 4(*b*) illustrates a wave form presented by a sharp cut-off filter while Fig. 4(*c*) shows the wave form of the frequency response of a transducer.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A marking signal generator comprising a source of voltage of cyclically varying frequency, a plurality of resonant devices energized by the variable frequency voltage, said resonant devices being tuned to different frequencies within the range of the varying frequency voltage, a plurality of positive feedback pulse generators, each of said positive feedback pulse generators being energized by one of said resonant devices to produce a marking pulse, and mixing means connected to each of the feedback pulse generators to form a composite marking signal including a plurality of marking pulses separated from each other by the difference in frequency between the resonant frequencies of the resonant devices.

2. A marking signal generator comprising a source of voltage of cyclically varying frequency, a plurality of resonant devices energized by the varying frequency voltage to produce a plurality of voltage disturbances, each of said resonant devices being tuned to a different frequency within the range of the varying frequency voltage so that each of the plurality of voltage disturbances is a different frequency, means connected to each of the resonant devices for clipping and shaping the voltage disturbance to form a marking pip, and mixing means connected to each of the clipping and shaping means to combine the marking pips into a marking signal wherein the pips are separated from each other by the differences between the resonant frequencies of the resonant devices.

3. A marking signal generator comprising a source of voltage of cyclically varying frequency, a plurality of resonant devices of different resonant frequencies, means for selectively energizing a predetermined number of said resonant devices to produce a predetermined number of voltage disturbances, means connected to said predetermined resonant devices for shaping and clipping the voltage disturbances to produce a predetermined number of marking pips, and mixing means for combining the marking pips into a marking signal wherein the pips are separated from each other by the differences in frequency between the predetermined resonant devices.

4. A marking signal generator comprising means for producing a plurality of voltage disturbances of different predetermined frequencies, a plurality of shaping and clipping means, each of said shaping and clipping means being energized by a different voltage disturbance to produce a marking pip, each of said shaping and clipping means including a positive feedback amplifier with grid voltage clipping, and mixing means energized by a plurality of the marking pips to produce a composite marking signal wherein the pips are separated from each other by distances representative of the different predetermined frequencies.

5. A marking signal generator comprising a source of voltage of cyclically varying frequency, a plurality of crystals of different resonant frequencies, means connected to the said voltage source for selectively energizing predetermined crystals to produce a plurality of voltage disturbances at different predetermined frequencies, means energized by the plurality of voltage disturbances for producing a plurality of marking pips, and means for combining the plurality of marking pips into a composite marking signal wherein the pips are separated by distances representative of the corresponding differences between the predetermined frequencies.

6. A marking pulse generator comprising a means for producing a voltage disturbance, a first amplifier energized by the voltage disturbance to produce an amplified output, a second amplifier having a grid energized by the amplified output, a first rectifier connected to the grid for removing negative portions of the amplified output, a voltage divider, said second amplifier providing a second amplified output connected to the voltage divider, a second rectifier connected in parallel with the voltage divider to remove positive portions of the second amplified output, and means for applying a portion of the second amplified output from the voltage divider to the first amplifier for reinforcing the original voltage disturbance to thereby produce a sharp marking pip.

7. A marking signal generator comprising means for producing a plurality of voltage disturbances of different predetermined frequencies, a plurality of shaping and clipping means, each of said shaping and clipping means being energized by a different voltage disturbance to produce a marking pip, a common plate mixer tube having cathode load resistors and grids of the tube connected to ground, and means for coupling each of the marking pips to one of the cathode load resistors whereby the mixer tube generates a composite marking signal wherein the pips are separated from each other by distances representative of the different predetermined frequencies.

8. A marking signal generator comprising a source of voltage of cyclically varying frequency, a plurality of crystal filters, each of said crystal filters being tuned to a different frequency within the range of the varying frequency voltage, means for selectively applying the varying frequency voltage to a desired number of the plurality of crystal filters to produce a number of voltage pulses, means connected to the filters for shaping the voltage pulses to form marking pulses, and mixing means energized by the marking pulses for combining these pulses into a marking signal wherein the marking pulses are spaced from each other by the difference in frequencies between the selected number of crystal filters.

JOHN W. BALDE.
JOSEPH C. BREGAR.
KENNETH L. CHAPMAN.

References Cited in the file of this patent

UNITED STATES PATENTS

| Number | Name | Date |
|---|---|---|
| 2,145,332 | Bedford | Jan. 31, 1939 |
| 2,226,459 | Bingley | Dec. 24, 1940 |
| 2,292,100 | Bliss | Aug. 4, 1942 |
| 2,484,352 | Miller et al. | Oct. 11, 1949 |